US012807113B2

(12) United States Patent
Yun

(10) Patent No.: US 12,807,113 B2
(45) Date of Patent: Nov. 24, 2026

(54) BRAKE DEVICE FOR VEHICLE

(71) Applicant: HYUNDAI MOBIS CO., LTD., Seoul (KR)

(72) Inventor: Seung Hyun Yun, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 490 days.

(21) Appl. No.: 18/462,048

(22) Filed: Sep. 6, 2023

(65) Prior Publication Data

US 2024/0262334 A1 Aug. 8, 2024

(30) Foreign Application Priority Data

Feb. 6, 2023 (KR) ........................ 10-2023-0015511

(51) Int. Cl.

| | |
|---|---|
| ***B60T 13/74*** | (2006.01) |
| ***B60T 7/04*** | (2006.01) |
| ***B60T 8/40*** | (2006.01) |
| ***G05G 5/03*** | (2008.04) |
| *F16D 125/40* | (2012.01) |

(52) U.S. Cl.

CPC ............ *B60T 13/745* (2013.01); *B60T 7/042* (2013.01); *G05G 5/03* (2013.01); *B60T 8/4086* (2013.01); *F16D 2125/40* (2013.01)

(58) Field of Classification Search

CPC ...... B60T 13/745; B60T 13/746; B60T 7/042; B60T 8/4086; F16D 2125/40; G05G 5/03

See application file for complete search history.

(56) References Cited

U.S. PATENT DOCUMENTS 8,899,696 B2 * 12/2014 Weiberle ............... B60T 8/4872
303/114.1
2024/0262334 A1 * 8/2024 Yun .......................... G05G 5/03

FOREIGN PATENT DOCUMENTS

| | | | | |
|---|---|---|---|---|
| CN | 108715162 A | * 10/2018 | ............ B60T 13/745 |
| CN | 112277906 A | 1/2021 | |
| DE | 102012211278 A1 | * 1/2014 | ............ B60T 8/3265 |
| DE | 102015200106 B3 | * 5/2016 | .............. B60T 7/042 |
| DE | 102019204554 A1 | 10/2020 | |
| GB | 2279125 A | * 12/1994 | ............ B60T 13/745 |
| JP | 5721068 B2 | * 5/2015 | .............. B60T 13/58 |
| KR | 10-2372394 B1 | 3/2022 | |

OTHER PUBLICATIONS

Extended European Search Report issued on Mar. 11, 2024 in the corresponding European Patent Application No. 23197133.4.

* cited by examiner

*Primary Examiner* — Thomas J Williams
(74) *Attorney, Agent, or Firm* — NovoTechIP International PLLC

(57) ABSTRACT

The present disclosure relates to a brake device for a vehicle, the brake device including a housing part, a gear part rotatably disposed in the housing part and configured to be rotated by receiving a rotational force of a motor, a motion conversion part installed inside the housing part, coupled to the gear part, and configured to convert a rotational motion of the gear part into a rectilinear motion, a piston part coupled to the motion conversion part and configured to be rectilinearly movable, a master cylinder part coupled to a first side of the housing part and configured such that the piston part is inserted into the master cylinder part to generate hydraulic pressure, and a pedal simulator part slidably disposed at a second side of the housing part and coupled to the motion conversion part.

15 Claims, 7 Drawing Sheets

1

BRAKE DEVICE FOR VEHICLE

CROSS-REFERENCE TO RELATED APPLICATIONS

This application claims the benefit of priority under 35 USC § 119(a) to Korean Patent Applications No. 10-2023-0015511, filed on Feb. 6, 2023, the entire disclosure of which is incorporated herein by reference for all purposes.

TECHNICAL FIELD

The present disclosure relates to a brake device for a vehicle, and more particularly, to a brake device for a vehicle, which is capable of implementing regenerative braking.

BACKGROUND

An electric brake system for a vehicle is a brake system that generates a braking force by using an electric caliper that is electronically controlled without mechanical connection. In general, an electric brake system applied to an electric vehicle implements regenerative braking.

To implement regenerative braking in the electric brake system in the related art, a separate independent chamber such as a valve is provided to structurally separate the electric brake system so that a force of a pedal is not transmitted to the force generated by the motor in order to eliminate heterogeneity of a pedal effort in a regenerative braking section.

In the case of the electric vehicle, a regenerative braking force is generated when a driver releases an accelerator pedal while the electric vehicle travels. There is a problem in that at the initial time of pushing the brake pedal, the driver feels great heterogeneity of the pedal effort corresponding to regenerative braking. Therefore, there is a need to solve the problems.

The background technology of the present disclosure is disclosed in Korean Patent No. 10-2372394 (published on Mar. 11, 2022 and entitled 'Brake Device for Vehicle').

SUMMARY

Various embodiments are directed to a brake device for a vehicle, which is capable of improving regenerative braking performance and implementing pedal pressure feel.

Various embodiments are also directed to a brake device for a vehicle, which is capable of reducing heterogeneity of a pedal effort during regenerative braking.

In an embodiment, a brake device for a vehicle includes: a housing part; a gear part rotatably disposed in the housing part and configured to be rotated by receiving a rotational force of a motor; a motion conversion part installed inside the housing part, coupled to the gear part, and configured to convert a rotational motion of the gear part into a rectilinear motion; a piston part coupled to the motion conversion part and configured to be rectilinearly movable; a master cylinder part coupled to a first side of the housing part and configured such that the piston part is inserted into the master cylinder part to generate hydraulic pressure; and a pedal simulator part slidably disposed at a second side of the housing part and coupled to the motion conversion part.

The brake device may further include: a first bearing part installed in the housing part so that the gear part is rotatably coupled to the first bearing part.

The motion conversion part may include: a screw bolt part slidably coupled to the gear part and configured to rotate together with the gear part; and a nut part coupled to the screw bolt part and configured to move along the screw bolt part.

The piston part may be coupled to the nut part and move together with the nut part.

The brake device may further include: a first elastic part disposed inside the housing part and configured to elastically support the nut part.

The nut part may include: a nut body part spirally coupled to the screw bolt part; and an anti-rotation part provided on the nut body part and configured to restrict a rotation of the nut body part.

The anti-rotation part may include: a first seating portion protruding from an outer peripheral edge of the nut body part so that the first elastic part is seated on the first seating portion; and a protruding portion protruding from an outer peripheral edge of the first seating portion and configured to adjoin an inner surface of the housing part.

The screw bolt part may include: a bolt body part slidably and axially coupled to an inner side of the gear part; and a screw shaft provided at one end of the bolt body part and spirally coupled to the nut body part so that the nut body part rectilinearly moves along the screw shaft.

The bolt body part may be formed in a prismatic shape.

The bolt body part may be formed in a hollow shape.

The pedal simulator part may include: a damper holder part slidably disposed in the housing part so that the bolt body part is rotatably coupled to the damper holder part; a damper piston part slidably disposed on the damper holder part; a damper part coupled to the damper piston part, accommodated in the damper holder part, and configured to be compressed by a movement of the damper piston part; a damper pressing part coupled to the damper piston part and configured to press the damper piston part; and a second elastic part installed between the damper pressing part and the damper holder part and configured to elastically support the damper pressing part.

The damper holder part may include: a holder body portion slidably coupled to an inner side of the housing part; and a holder protruding portion protruding from an outer surface of the holder body portion and inserted into the bolt body part.

The damper pressing part may include: a push rod portion rotatably coupled to the damper piston part; and a second seating portion to which the push rod portion is axially coupled and on which the second elastic part is seated.

The brake device may further include: a second bearing portion provided on the damper holder part so that the bolt body part is seated on the second bearing portion, the second bearing portion being configured to support the bolt body part so that the bolt body part is rotatable.

In an embodiment, a brake device for a vehicle includes: a housing part; a gear part rotatably disposed in the housing part and configured to be rotated by receiving a rotational force of a motor; a motion conversion part installed inside the housing part, coupled to the gear part, and configured to convert a rotational motion of the gear part into a rectilinear motion; a piston part coupled to the motion conversion part and configured to be rectilinearly movable; a master cylinder part coupled to a first side of the housing part and configured such that the piston part is inserted into the master cylinder part to generate hydraulic pressure; and a pedal simulator part disposed at a second side of the housing part and coupled to the motion conversion part, the pedal simulator part being configured such that the pedal simulator part is incapable of being moved by a reaction force of the hydraulic pressure when the motor operates, and the pedal simulator part is capable of sliding when the motor does not operate.

According to the present disclosure, it is possible to improve regenerative braking performance and increase the amount of regenerative braking.

In addition, according to the present disclosure, it is possible to minimize an increase in number of components and implement pedal pressure feel without increasing a layout.

In addition, according to the present disclosure, it is possible to reduce heterogeneity of a pedal effort during regenerative braking.

DETAILED DESCRIPTION

Figure 1:
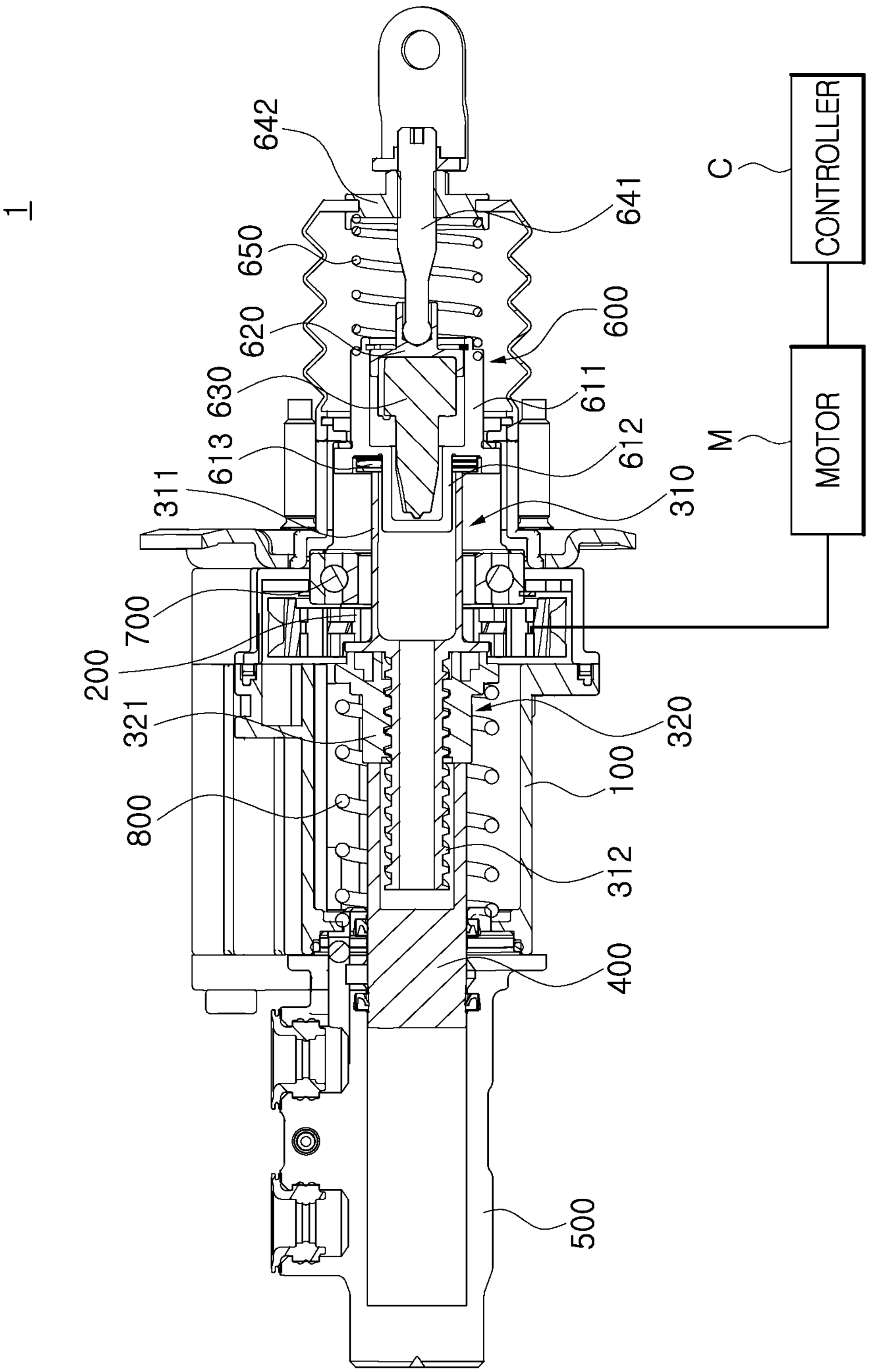
FIG. 1 is a cross-sectional view illustrating a brake device for a vehicle according to an embodiment of the present disclosure.

Hereinafter, a brake device for a vehicle according to the present disclosure will be described below with reference to the accompanying drawings through various exemplary embodiments. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, the definition of the terms should be made based on the entire contents of the present specification.

Figure 2:
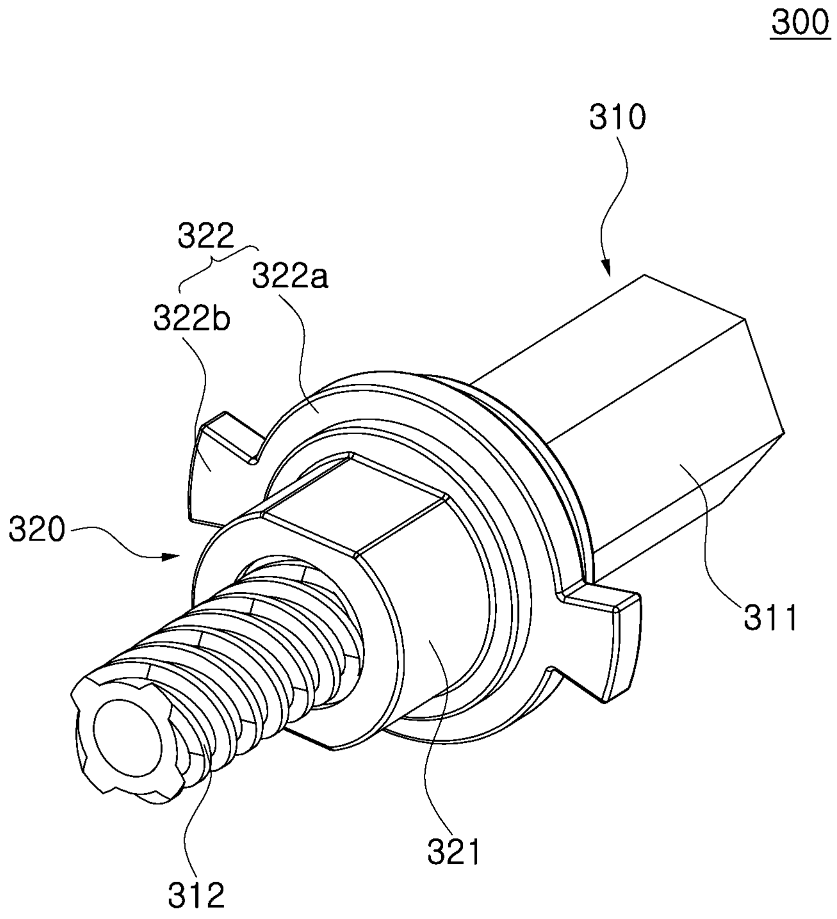
FIGS. 2 and 3 are perspective views illustrating a motion conversion part of the brake device for a vehicle according to the embodiment of the present disclosure.
Figure 3:
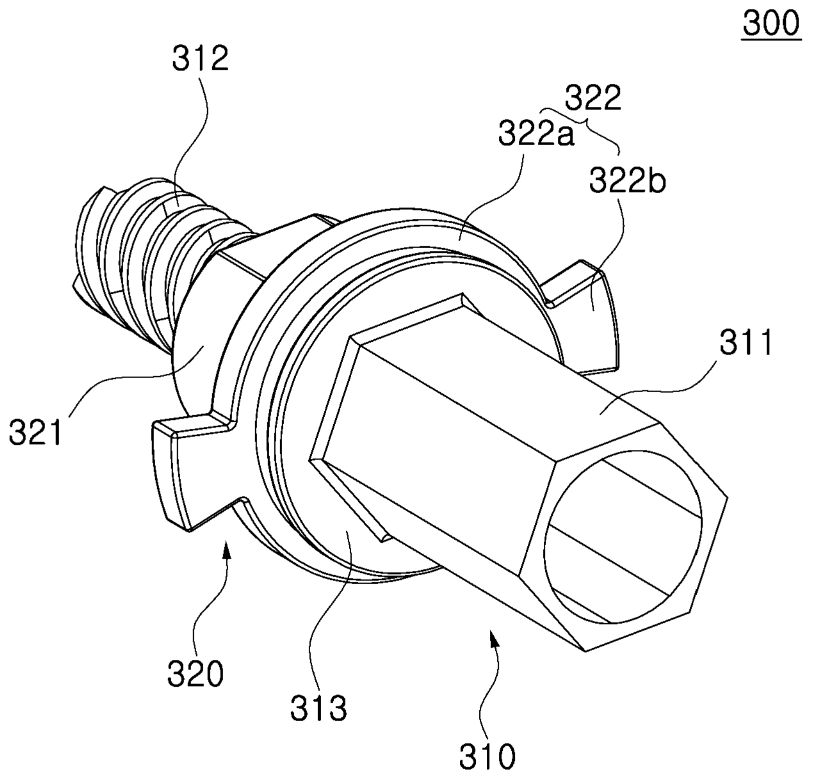
Figure 4:
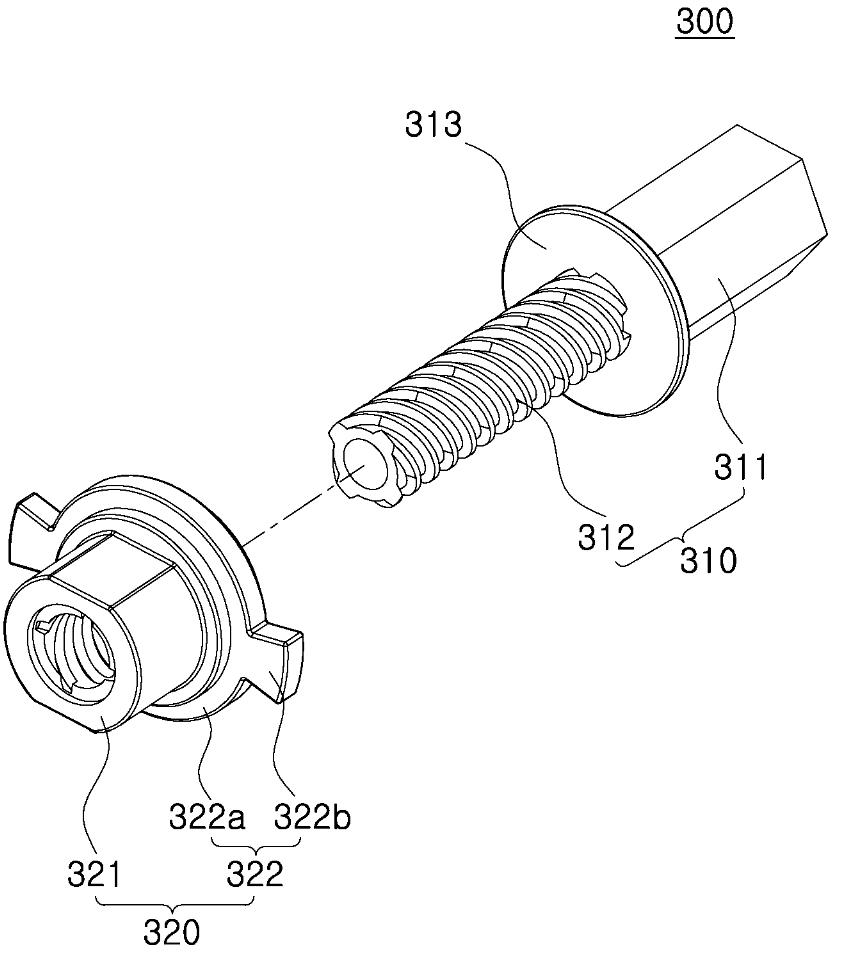
FIG. 4 is an exploded perspective view of FIG. 2.
Figure 5:
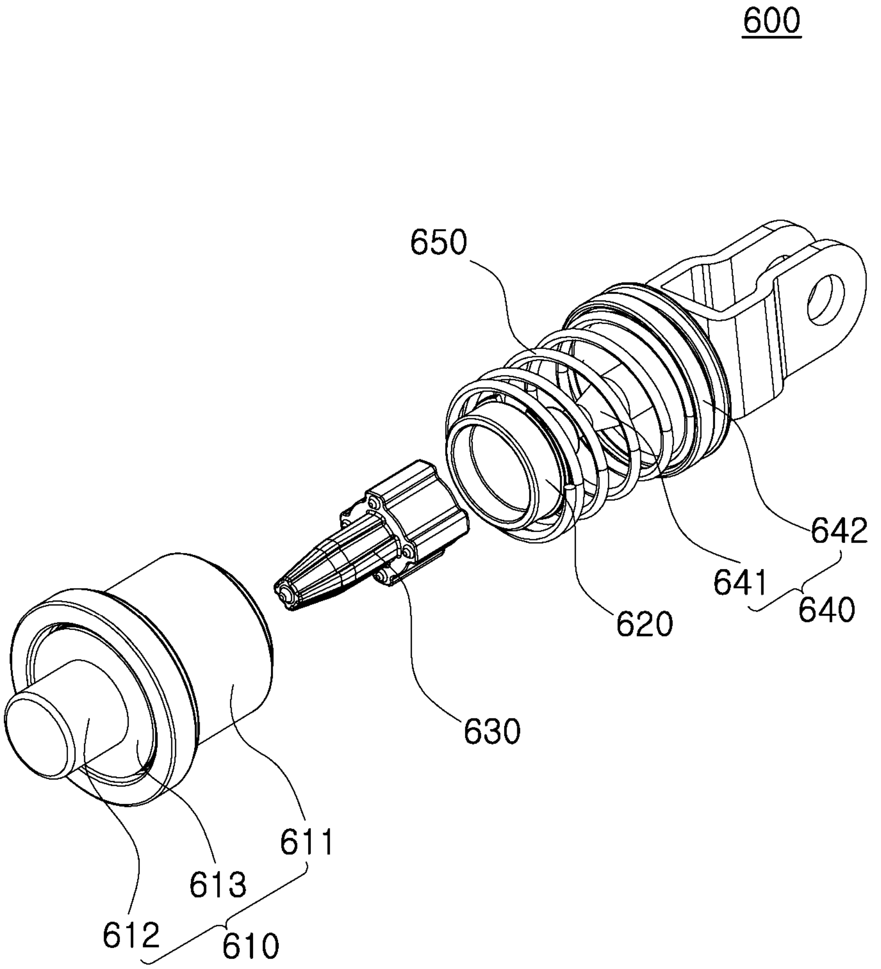
FIG. 5 is an exploded perspective view illustrating a pedal simulator of the brake device for a vehicle according to the embodiment of the present disclosure.

FIG. 1 is a cross-sectional view illustrating a brake device for a vehicle according to an embodiment of the present disclosure, FIGS. 2 and 3 are perspective view illustrating a motion conversion part of the brake device for a vehicle according to the embodiment of the present disclosure, FIG. 4 is an exploded perspective view of FIG. 2, and FIG. 5 is an exploded perspective view illustrating a pedal simulator of the brake device for a vehicle according to the embodiment of the present disclosure.

With reference to FIGS. 1 to 5, a brake device 1 for a vehicle according to an embodiment of the present disclosure includes a housing part 100, a gear part 200, a motion conversion part 300, a piston part 400, a master cylinder part 500, a pedal simulator part 600, a first bearing part 700, and a first elastic part 800. These components will be described in detail.

The housing part 100 has a hollow shape having an internal space. A motor M is provided at an outer side of the housing part 100.

The gear part 200 is rotatably disposed in the housing part 100. The gear part 200 may be positioned inside the housing part 100. Alternatively, the gear part 200 may be disposed at one side of the housing part 100 and rotatably connected to the housing part 100. The gear part 200 is connected to the motor M positioned at the outer side of the housing part 100 and rotates in response to a rotational force received the motor M. The gear part 200 may be formed in a hollow shape penetrated by a central portion thereof.

The first bearing part 700 may be disposed within (e.g., installed in) the housing part 100, and the gear part 200 may be rotatably connected to the first bearing part 700. An outer race of the first bearing part 700 may adjoin an inner surface of the housing part 100, and an inner race of the first bearing part 700 may adjoin an outer surface of the gear part 200.

The motion conversion part 300 is installed in the housing part 100 and coupled to the gear part 200. The motion conversion part 300 may serve to convert a rotational motion of the gear part 200 into a rectilinear motion and include a screw bolt part 310 and a nut part 320.

In one embodiment of the motion conversion part 300, the screw bolt part 310 may be coupled to the gear part 200 and rotate together with the gear part 200, and the nut part 320 may be coupled to the screw bolt part 310 and rectilinearly move along the screw bolt part 310.

As another embodiment of the motion conversion part 300, the nut part 320 may be coupled to the gear part 200 and rotate together with the gear part 200, and the screw bolt part 310 coupled to the nut part 320 may be rectilinearly moved in an axial direction by the rotation of the nut part 320. In this case, the piston part 400 to be described below may be coupled to the screw bolt part 310 configured to rectilinearly move.

Hereinafter, an embodiment will be described in which the nut part 320 coupled to the screw bolt part 310 of the motion conversion part 300 of the brake device 1 for a vehicle according to the present disclosure is configured to rectilinearly move along the screw bolt part 310.

The screw bolt part 310 is installed inside the housing part 100. The screw bolt part 310 is movably accommodated in the housing part 100. The screw bolt part 310 is disposed in a longitudinal direction of the housing part 100.

The screw bolt part 310 is slidably coupled to the gear part 200. More specifically, the screw bolt part 310 may penetrate the central portion of the gear part 200 and be slidably coupled to the inside of the gear part 200. The screw bolt part 310 may reciprocate straight in the longitudinal direction of the housing part 100. The screw bolt part 310 may rotate together with the gear part 200 in a direction identical to the rotation direction of the gear part 200.

The screw bolt part 310 may include a bolt body part 311 and a screw shaft 312.

The bolt body part 311 may penetrate the central portion of the gear part 200 and be axially coupled to the gear part 200. The bolt body part 311 may slide inside the gear part 200. The bolt body part 311 may be formed in a prismatic shape. More specifically, a transverse section of the bolt body part 311 may be formed in a polygonal shape having an angled edge.

An inner diameter of the gear part 200 may be equal to an outer diameter of the bolt body part 311 so that the gear part 200 and the bolt body part 311, which rotate, engage with each other. One end (right side based on FIG. 1) of the bolt body part 311 may be formed in an opened, hollow shape having an empty space. A damper holder part 610 of the pedal simulator part 600 may be inserted into the bolt body part 311, such that the damper holder part 610 may be accommodated in the bolt body part 311.

The screw shaft 312 is positioned at one end (left side based on FIG. 1) of the bolt body part 311. The screw shaft 312 may be integrated with the bolt body part 311. The screw shaft 312 and the bolt body part 311 may be disposed on the same axis. The screw shaft 312 axially rotates in a direction identical to the rotation direction of the bolt body part 311 that is rotated by the rotation of the gear part 200.

A screw thread may be formed on an outer surface of the screw shaft 312 and disposed along an outer diameter of the screw shaft 312. The nut part 320 is spirally coupled to the screw shaft 312. The nut part 320 reciprocates straight in the axial direction of the screw shaft 312 in the rotation direction of the screw shaft 312.

The nut part 320 is coupled to the screw bolt part 310 and moves along the screw bolt part 310. The nut part 320 may include a nut body part 321 and an anti-rotation part 322.

The nut body part 321 is spirally coupled to the screw shaft 312. A screw thread may be formed on an inner surface of the nut body part 321 and disposed along an inner diameter of the nut body part 321.

The anti-rotation part 322 is provided on the nut body part 321. The anti-rotation part 322 may restrict a rotation of the nut body part 321 so that the nut body part 321, which moves along the screw shaft 312, is not rotated together with the screw shaft 312. The anti-rotation part 322 may be integrated with the nut body part 321. The anti-rotation part 322 may include a first seating portion 322*a* and a protruding portion 322*b*.

The first seating portion 322*a* may protrude from an outer peripheral edge of the nut body part 321. The first seating portion 322*a* may be formed in a circumferential direction of the nut body part 321. The first elastic part 800 is disposed (or seated) on an outer surface of the first seating portion 322*a* in a state in which one side (right side based on FIG. 1) of the first elastic part 800 is in contact with the outer surface of the first seating portion 322*a*. More specifically, one side of the first elastic part 800 is supported on the first seating portion 322*a*.

The first elastic part 800 is housed within (e.g., disposed inside) the housing part 100 and elastically supports the nut part 320. One side (left side based on FIG. 1) of the first elastic part 800 adjoins the inner surface of the housing part 100, and the other side (right side based on FIG. 1) of the first elastic part 800 adjoins an outer surface of the nut part 320. The first elastic part 800 provides an elastic force to the screw bolt part 310 to which the nut part 320 is coupled.

The first elastic part 800 is compressed by the nut part 320 that rectilinearly moves along the screw shaft 312. Alternatively, the first elastic part 800 is compressed by the screw bolt part 310 that rectilinearly slides in the gear part 200. The compressed first elastic part 800 restores the screw bolt part 310 to an original position by providing an elastic force (elastic restoring force) to the screw bolt part 310. The first elastic part 800 may be a coil spring that surrounds an outer side of the piston part 400.

The protruding portion 322*b* may protrude from an outer peripheral edge of the first seating portion 322*a*. The protruding portion 322*b* may be provided as a plurality of protruding portions 322*b* spaced apart from one another in a circumferential direction of the first seating portion 322*a*. The protruding portion 322*b* may adjoin the inner surface of the housing part 100. More specifically, the housing part 100 may have a guide part configured to guide the rectilinear movement of the nut part 320. The guide part may be recessed in the inner surface of the housing part 100. The guide part may be formed in the longitudinal direction of the housing part 100. The protruding portion 322*b* is positioned inside the guide part, and the protruding portion 322*b* moves along the guide part, such that the nut body part 321 may rectilinearly move without rotating.

The piston part 400 may be coupled to the nut part 320. More specifically, a rod part of the piston part 400 may be coupled to surround an outer side of the nut body part 321. The piston part 400 may rectilinearly move together with the nut part 320 in conjunction with the nut part 320. A head portion of the piston part 400 may be inserted into the master cylinder part 500 provided at one side (left side based on FIG. 1) of the housing part 100.

The master cylinder part 500 may be coupled to one side of the housing part 100. As another embodiment, the master cylinder part 500 may be integrated with the housing part 100. The master cylinder part 500 is formed in a hollow shape having an empty space. The inside of the housing part 100 and the inside of the master cylinder part 500 may communicate with each other. The piston part 400 may be inserted into the master cylinder part 500. The master cylinder part 500 generates hydraulic braking pressure by being pressed by the piston part 400.

The pedal simulator part 600 is slidably disposed at the other side (right side based on FIG. 1) of the housing part 100. The screw bolt part 310 is rotatably coupled to the pedal simulator part 600. The pedal simulator part 600 may include the damper holder part 610, a damper piston part 620, a damper part 630, a damper pressing part 640, and a second elastic part 650.

The damper holder part 610 is slidably disposed on the housing part 100. The bolt body part 311 is rotatably coupled to the damper holder part 610. The damper holder part 610 may include a holder body portion 611, a holder protruding portion 612, and a second bearing portion 613.

One end (right side based on FIG. 1) of the holder body portion 611 may be formed in an opened, hollow shape having an empty space. The holder body portion 611 may be slidably coupled to an inner side of the housing part 100.

The holder protruding portion 612 may be provided on the holder body portion 611. The holder protruding portion 612 may protrude from an outer surface (left surface based on FIG. 1) of the holder body portion 611 and be formed in a hollow shape having an empty space. The inside of the holder body portion 611 and the inside of the holder protruding portion 612 may communicate with each other. The damper part 630 is accommodated inside the holder body portion 611 and the holder protruding portion 612. A diameter of the holder protruding portion 612 may be smaller than a diameter of the holder body portion 611. The holder protruding portion 612 may be inserted into the bolt body part 311, and hence may have a portion extending into the body part 311.

The second bearing portion 613 is provided on the damper holder part 610. The second bearing portion 613 may be coupled to an outer surface of the damper holder part 610 that is directed toward the screw bolt part 310. More specifically, the second bearing portion 613 may be rotatably coupled to an outer surface (left surface based on FIG. 1) of the holder body portion 611 and provided to surround an outer periphery of the holder protruding portion 612. One end (right end based on FIG. 1) of the bolt body part 311 is seated on the second bearing portion 613. The second bearing portion 613 supports the bolt body part 311 so that the bolt body part 311 is rotatable. The second bearing portion 613 may support an axial load of the screw bolt part 310.

The damper piston part 620 may be slidably disposed on the damper holder part 610. More specifically, the damper piston part 620 may be movably accommodated in the holder body portion 611.

The damper part 630 may be coupled to the damper piston part 620. The damper part 630 may be accommodated inside the holder body portion 611 and the holder protruding portion 612 and compressed in the holder body portion 611 and the holder protruding portion 612 by the movement of the damper piston part 620. The damper part 630 may be manufactured by including an elastically deformable material. The damper part 630 may include rubber, silicone, plastic, or the like as the elastically deformable material.

The damper pressing part 640 is coupled to the damper piston part 620 and presses the damper piston part 620. The damper pressing part 640 may include a push rod portion 641 and a second seating portion 642.

The push rod portion 641 may be rotatably coupled to an outer surface (right surface based on FIG. 1) of the damper piston part 620 in a joint manner. In addition, the push rod portion 641 may be coupled to the damper piston part 620 by caulking.

The push rod portion 641 is axially coupled to the second seating portion 642. More specifically, the push rod portion 641 may penetrate a central portion of the second seating portion 642 and be coupled to the second seating portion 642. The second elastic part 650 is seated on the second seating portion 642.

The second elastic part 650 is installed between the damper pressing part 640 and the damper holder part 610 and elastically supports the damper pressing part 640. One side (right side based on FIG. 1) of the second elastic part 650 adjoins an outer surface of the second seating portion 642, and the other side (left side based on FIG. 1) of the second elastic part 650 adjoins one end of the holder body portion 611. The second elastic part 650 provides an elastic force to the damper pressing part 640 that is moved by an external force applied to the damper pressing part 640.

The second elastic part 650 is compressed by the second seating portion 642 that is moved by an external force applied to the damper pressing part 640. The compressed second elastic part 650 restores the second seating portion 642 to an original position by providing an elastic force (elastic restoring force) to the second seating portion 642. The second elastic part 650 may be a coil spring that surrounds an outer side of the push rod portion 641.

An operating process of the brake device for a vehicle according to the embodiment of the present disclosure configured as described above will be described below.

Figure 6:
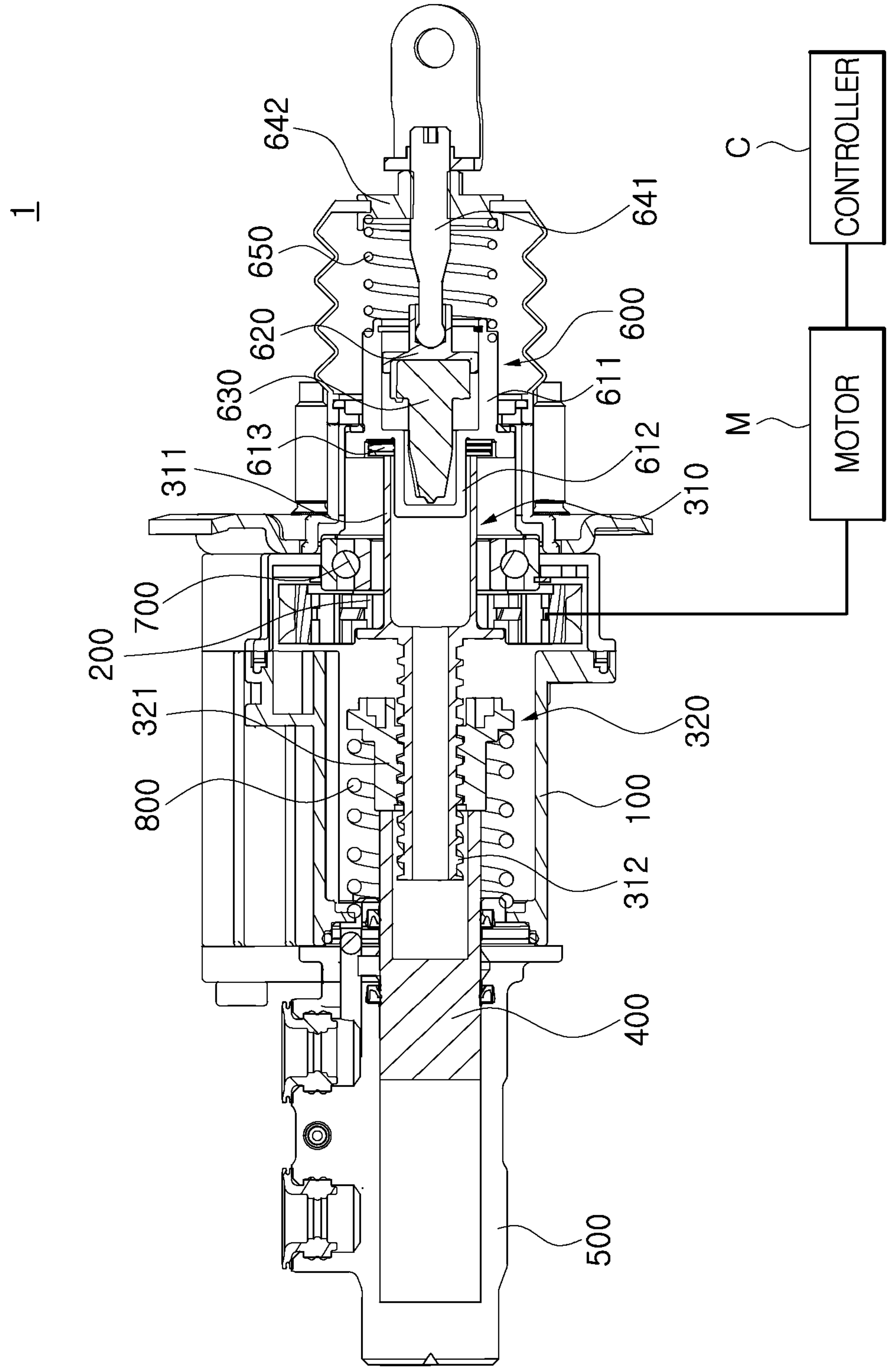
FIG. 6 is a cross-sectional view illustrating a normal braking operating state of the brake device for a vehicle according to the embodiment of the present disclosure.
Figure 7:
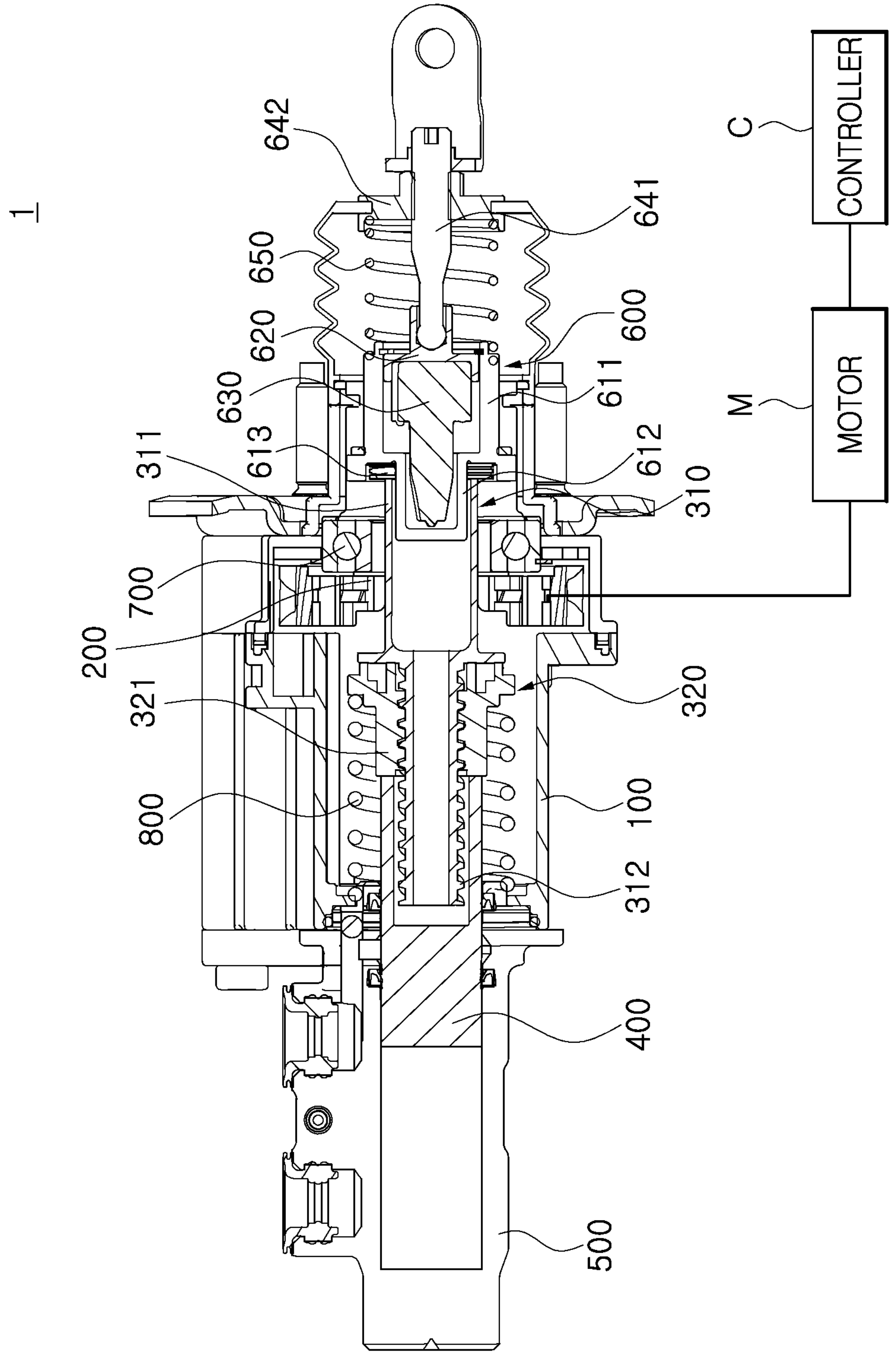
FIG. 7 is a cross-sectional view illustrating a back-up operating state of the brake device for a vehicle according to the embodiment of the present disclosure.

FIG. 6 is a cross-sectional view illustrating a normal braking operating state of the brake device for a vehicle according to the embodiment of the present disclosure, and FIG. 7 is a cross-sectional view illustrating a back-up operating state of the brake device for a vehicle according to the embodiment of the present disclosure.

With reference to FIG. 6, the motor M operates in response to a braking signal of a controller C, which is generated when the user pushes the pedal, and rotates the gear part 200, such that the gear part 200 rotates the bolt body part 311. The nut part 320 is moved along the screw shaft 312 (in a leftward direction based on FIG. 6) by the rotation of the bolt body part 311, and the hydraulic braking pressure is formed in the master cylinder part 500 by the piston part 400 coupled to the nut body part 321. In this case, the first elastic part 800 is compressed by the movement of the nut part 320.

The screw bolt part 310 is not moved but fixed in position by the elastic force of the compressed first elastic part 800 and the hydraulic pressure reaction force applied to the screw bolt part 310 through the piston part 400 by the movement of the nut part 320. The position of the pedal simulator part 600 is also fixed as the position of the screw bolt part 310 is fixed.

When the damper pressing part 640 is pressed by an external force, the damper pressing part 640 moves toward the damper holder part 610. The second elastic part 650 is compressed and deformed by being pressed by the second seating portion 642 by the movement of the damper pressing part 640. When the second elastic part 650 is compressed, the user may feel initial braking performance.

When the external force is continuously applied to the damper pressing part 640 and the push rod portion 641 presses the damper piston part 620, the damper piston part 620 compresses the damper part 630 while moving toward the inside of the damper holder part 610. In this case, the user may feel mid-to-end braking performance.

With reference to FIG. 7, when the motor M is not operated by a back-up braking signal of the controller C, the hydraulic pressure reaction force to be applied to the screw bolt part 310 is not generated. When the user pushes the pedal, the pedal simulator part 600 slides in the housing part 100 (in the leftward direction based on FIG. 7), the bolt body part 310 slides in the gear part 200 (in the leftward direction based on FIG. 7), and the nut part 320 coupled to the screw shaft 312 is also moved, such that the hydraulic braking pressure is formed in the master cylinder part 500 by the piston part 400 coupled to the nut body part 321. A pressing plate 313 of the screw bolt part 310 presses the anti-rotation part 322, and thereby the nut part 320 moves forward.

The brake device 1 for a vehicle according to the embodiment of the present disclosure may improve regenerative braking performance and increase the amount of regenerative braking.

The brake device 1 for a vehicle according to the embodiment of the present disclosure may minimize an increase in number of components and implement pedal pressure feel without increasing a layout.

The brake device 1 for a vehicle according to the embodiment of the present disclosure may reduce heterogeneity of a pedal effort during regenerative braking.

While the present disclosure has been described with reference to the embodiments depicted in the drawings, the embodiments are for illustrative purposes only, and those skilled in the art to which the present technology pertains will understand that various modifications of the embodiments and any other embodiments equivalent thereto are available. Accordingly, the true technical protection scope of the present disclosure should be determined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake device for a vehicle, the brake device comprising:
- a housing part;
- a gear part rotatably disposed at the housing part and configured to rotate in response to a rotational force received from a motor;

a motion conversion part housed within the housing part, coupled to the gear part, and configured to convert a rotational motion of the gear part into a rectilinear motion;

a piston part coupled to the motion conversion part and configured to be rectilinearly movable;

a master cylinder part coupled to a first side of the housing part, wherein the piston part is inserted into the master cylinder part;

a pedal simulator part slidably disposed at a second side of the housing part and coupled to the motion conversion part; and a first elastic part disposed within the housing part, wherein the motion conversion part comprises:

a screw bolt part slidably coupled to the gear part and configured to rotate together with the gear part; and a nut part coupled to the screw bolt part and configured to move along the screw bolt part, wherein the first elastic part is configured to surround both the screw bolt part and the nut part, elastically supporting the nut part and directly contacting the nut part.

2. The brake device of claim 1, further comprising a first bearing part disposed within the housing part, wherein the gear part is rotatably coupled to the first bearing part.

3. The brake device of claim 1, wherein the piston part is coupled to the nut part and configured to move together with the nut part.

4. The brake device of claim 1, wherein the nut part comprises:

a nut body part (321) spirally coupled to the screw bolt part; and an anti-rotation part (322*b*) disposed on the nut body part and configured to restrict a rotation of the nut body part.

5. The brake device of claim 4, wherein the anti-rotation part comprises:

a first seating portion (322*a*) protruding from the nut body part, wherein the first elastic part is disposed on the first seating portion; and a protruding portion protruding from the first seating portion and adjoining an inner surface of the housing part.

6. The brake device of claim 1, wherein the first elastic part is a coil spring.

7. A brake device for a vehicle, the brake device comprising:

a housing part;

a gear part rotatably disposed at the housing part and configured to rotate in response to a rotational force received from a motor;

a motion conversion part housed within the housing part, coupled to the gear part, and configured to convert a rotational motion of the gear part into a rectilinear motion;

a piston part coupled to the motion conversion part and configured to be rectilinearly movable;

a master cylinder part coupled to a first side of the housing part, wherein the piston part is inserted into the master cylinder part;

a pedal simulator part slidably disposed at a second side of the housing part and coupled to the motion conversion part; and a first elastic part disposed within the housing part, wherein the motion conversion part comprises:

a screw bolt part slidably coupled to the gear part and configured to rotate together with the gear part; and a nut part coupled to the screw bolt part and configured to move along the screw bolt part, wherein:

the first elastic part is configured to elastically support the nut part and directly contacts the nut part;

the nut part comprises a nut body part spirally coupled to the screw bolt part, and an anti-rotation part disposed on the nut body part and configured to restrict a rotation of the nut body part; and the screw bolt part comprises a bolt body part slidably and axially coupled to an inner side of the gear part, and a screw shaft provided at the bolt body part and spirally coupled to the nut body part, wherein the nut body part rectilinearly moves along the screw shaft.

8. The brake device of claim 7, wherein the bolt body part has a prismatic shape.

9. The brake device of claim 7, wherein the bolt body part has a hollow shape.

10. The brake device of claim 7, wherein the pedal simulator part comprises:

a damper holder part slidably disposed within the housing part, wherein the bolt body part is rotatably coupled to the damper holder part;

a damper piston part slidably disposed on the damper holder part;

a damper part coupled to the damper piston part, accommodated in the damper holder part, and configured to be compressed by a movement of the damper piston part;

a damper pressing part coupled to the damper piston part and configured to press the damper piston part; and a second elastic part disposed between the damper pressing part and the damper holder part and configured to elastically support the damper pressing part.

11. The brake device of claim 10, wherein the damper holder part comprises:

a holder body portion slidably coupled to an inner side of the housing part; and a holder protruding portion protruding from an outer surface of the holder body portion and having a portion extending into the bolt body part.

12. The brake device of claim 10, wherein the damper pressing part comprises:

a push rod portion rotatably coupled to the damper piston part; and a second seating portion, to which the push rod portion is axially coupled and on which the second elastic part is disposed.

13. The brake device of claim 10, further comprising a second bearing portion disposed on the damper holder part, wherein the bolt body part is disposed on the second bearing portion, and the second bearing portion is configured to support the bolt body part so that the bolt body part is rotatable.

14. A brake device for a vehicle, the brake device comprising:

a housing part;

a gear part rotatably housed within the housing part and configured to rotate in response to a rotational force received from a motor;

a motion conversion part disposed within the housing part, coupled to the gear part, and configured to convert a rotational motion of the gear part into a rectilinear motion;

a piston part coupled to the motion conversion part and configured to be rectilinearly movable;

a master cylinder part coupled to a first side of the housing part, wherein the piston part is inserted into the master cylinder part to generate a hydraulic pressure; and a pedal simulator part disposed at a second side of the housing part and coupled to the motion conversion part, wherein the pedal simulator part is configured (1) not to move by a reaction force of the hydraulic pressure when the motor is operated, and (2) to slidably move when the motor is not operated, and a first elastic part disposed within the housing part, wherein the motion conversion part comprises:

a screw bolt part slidably coupled to the gear part and configured to rotate together with the gear part; and a nut part coupled to the screw bolt part and configured to move along the screw bolt part, and wherein the first elastic part is configured to surround both the screw bolt part and the nut part, elastically supporting the nut part and directly contacting the nut part.

15. The brake device of claim 14, wherein the first elastic part is a coil spring.

* * * * *